(12) United States Patent
Harada et al.

(10) Patent No.: US 6,628,268 B1
(45) Date of Patent: Sep. 30, 2003

(54) TRANSPARENT TOUCH PANEL AND ELECTRONIC EQUIPMENT USING THE SAME

(75) Inventors: Mitsuru Harada, Osaka (JP); Kazunori Omoya, Osaka (JP); Koji Hashimoto, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 194 days.

(21) Appl. No.: 09/629,220

(22) Filed: Jul. 31, 2000

(30) Foreign Application Priority Data

Jul. 30, 1999 (JP) .......................................... 11-216393

(51) Int. Cl.$^7$ ................................................ G09G 5/00
(52) U.S. Cl. ...................... 345/173; 345/174; 345/175; 345/176; 345/177
(58) Field of Search ................................ 345/173, 174, 345/175, 176, 177

(56) References Cited

U.S. PATENT DOCUMENTS

| | | | |
|---|---|---|---|
| 4,532,395 A | | 7/1985 | Zukowski |
| 4,731,694 A | | 3/1988 | Grabner et al. |
| 4,771,277 A | | 9/1988 | Barbee et al. |
| 6,310,612 B1 | * | 10/2001 | Kotsubo et al. ............ 345/173 |
| 6,356,259 B1 | * | 3/2002 | Maeda et al. ............... 345/173 |

\* cited by examiner

*Primary Examiner*—Matthew C. Bella
*Assistant Examiner*—Tam Tran
(74) *Attorney, Agent, or Firm*—RatnerPrestia

(57) ABSTRACT

A TTP comprising two substrates each provided with a transparent resistive-layer, and an insulating section formed on at least one of the transparent resistive-layers using an ultra violet curing resin or an electron beam curing resin. The glass transition temperature of the cured resin in the insulating section is not higher than 80° C., and the insulating section contains a methyl ethyl keton soluble component of not less than 5 weight % and not more than 80 weight %. Since the insulating section is cured at a low temperature, it may be formed on a plastic substrate whose heat-withstanding capability is low. The insulating section can be formed in any desired shape and it can be cured within a short curing time, which are quite advantageous properties for the production of TTPs in volume. The insulating section spreads only minimally during the curing operation, therefore the initial shape, if it is a fine pattern, can be well preserved. Since an acid, alkaline solution or organic solvent is not used for forming the insulating section in the present invention, TTPs thus manufactured are free from the safety problems on the production floor as well as the environmental hazards associated with the use of these chemicals. The same applies also to an electronic system that incorporates the TTP.

6 Claims, 1 Drawing Sheet

TRANSPARENT TOUCH PANEL AND ELECTRONIC EQUIPMENT USING THE SAME

FIELD OF THE INVENTION

The present invention relates to a transparent touch panel attached on an LCD or a similar flat display device, and electronic equipment using the transparent touch panel.

BACKGROUND OF THE INVENTION

One type of structural design used for transparent touch panels (TTP) is known as the analog resistive-layer type. An analog resistive-layer TUP comprises a lower transparent resistive-layer substrate (1) made of a transparent resistive-layer made of Indium Tin Oxide (ITO) formed on a transparent glass plate or a similar material, the resistive-layer having a pair of belt-shape electrodes provided at both sides, and an upper transparent resistive-layer substrate (2) made of a transparent flexible insulating base material, such as a polyester film, the transparent resistive-layer having a pair of belt-shape electrodes formed on the lower surface in the same way as those of the lower transparent resistive-layer substrate. The above-described two substrates (1) and (2) are coupled together after shifting the relative orientation of the belt-shape electrodes by 90 degrees, with a spacer interposed between the respective resistive-layers. This completes a finished analog type TTP.

There have been a number of ways for separating and insulating the resistive-layer of substrate (1) from that of substrate (2) in regions other than the input area (operation area) of the analog resistive-layer TTPs. The separation methods include; (a) chemically etching the resistive-layer with an acid or alkaline solution, (b) affixing an insulating substrate patterned in a certain desired shape on the resistive-layer, and (c) coating the resistive layer with an epoxy resin, or similar thermosetting resin. Conventionally, any one of the above-described methods has been used for forming the insulating section.

These methods of forming the insulating section have following drawbacks.

The chemical etching method uses a strong acid or alkaline liquid, which is hazardous to the factory workers in the environment. Wastewater from the factory requires an appropriate environmental treatment, which adds additional cost.

The method of affixing a patterned insulating substrate requires that such an item be prepared in various shapes in accordance with various design concepts of TTPs. This leads to a complication in the manufacturing process, and hence to a higher manufacturing cost.

The method of coating the resistive layer a thermosetting resin is advantageous in that it can provide the insulating section in any desired form. It is a method that works for large scale production. However, the curing of resin requires heating; therefore, only a heat-resistive material can be used for the substrate of transparent resistive-layer. Furthermore, the thermosetting resin printed precisely to a certain specific form tends to become imprecise along the edge and in corners due to the lowered viscosity caused by the heat applied during curing.

The present invention addresses the above technical problems in the conventional methods of providing the insulating section, and offers a TTP in which the insulation on the resistive-layers is well secured in regions other than the input section and reveals a remarkable advantage for large scale manufacturing. Furthermore, the TTPs manufactured in accordance with the present invention generate very few environmental hazards. Also described in the present invention is an electronic system incorporating the TTP.

SUMMARY OF THE INVENTION

The present invention is a transparent touch panel comprising two substrates, each having a transparent resistive-layer, the substrates being coupled together with the respective resistive-layers facing each other while keeping a specific separation. The TTP functions as an electrical switch when one of the substrates is pressed. The TTP of the present invention includes an insulating section on one of the transparent resistive-layers for separating the transparent resistive-layers from each other in a region other than the input section by using a UV (ultra violet) curing resin or an EB (electron beam) curing resin, on at least one of the substrates having a transparent resistive-layer.

In a TTP of the present invention, it is easy to secure a sure insulation on the transparent resistive-layers in a region other than the input section. Since the resin used for forming the insulating section in the present invention is cured at a low temperature, the substrate can be made of a plastic material with low heat-withstanding capabilities. The insulating section may be formed in any desired shape, and it can be cured within a very short period of time; which is quite an advantage for carrying out large scale production. Since the curing is completed within a very short curing time, it offers still another advantage. Namely, the insulating section, even if it is has a fine pattern, can be formed precisely in a desired arrangement because the resin spreads only minimally during the curing time. Since formation of the insulating section does not use an acid, alkaline solution, or organic solvent that requires special treatment before disposal, a TTP of the present invention has the additional advantages of providing increased worker and environmental safety. The same applies to an electronic system employing the TTP.

DESCRIPTION OF THE PREFERRED EMBODIMENTS

Figure 1:
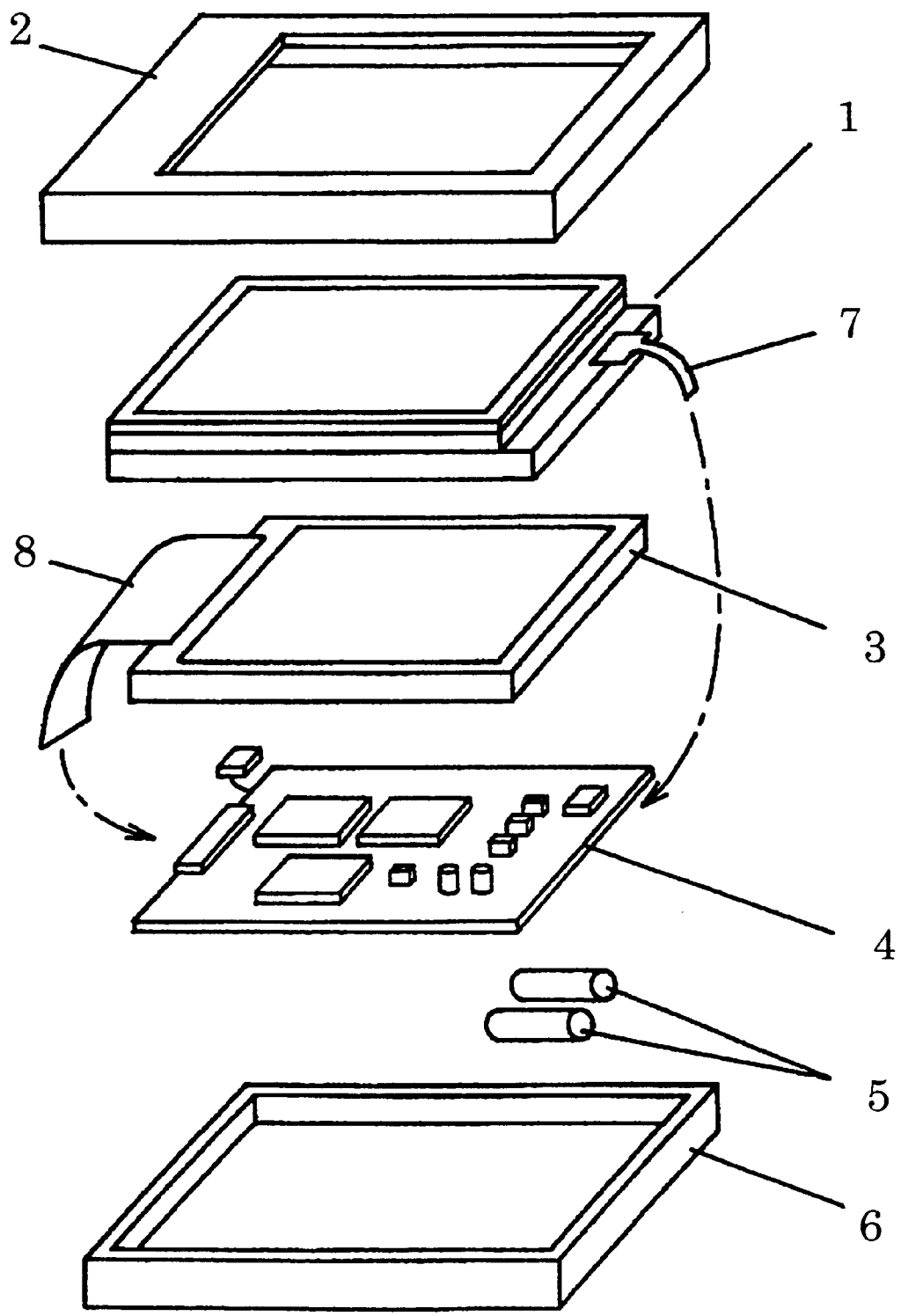
FIG. 1 is a perspective view showing a hand-held computer that is an electronic system in accordance with an exemplary embodiment of the present invention.

Exemplary embodiments of the present invention are described below in details.

First Embodiment

A 0.8 mm thick polycarbonate sheet provided with an ITO layer over the whole surface area is used for the lower transparent resistive-layer substrate (1). A 188 $\mu$m thick polyethylene terephthalate (PET) film provided with an ITO layer over the whole surface area is used for the upper transparent resistive-layer substrate (2). On the substrate (1), an insulating section is formed in a region where the insulation is required, or an area other than the input section, by printing a UV curing resin using a screen printing method and curing it with irradiation from an ultra violet source. A belt-shaped silver electrode for connection, wiring pattern, or similar structure is formed on the respective substrates. The substrates are adhered together so that the lower transparent resistive-layer and the upper transparent resistive-layer face each other. A TTP of the embodiment is thus completed. Composition of the UV curing resin is shown in Table 1, while physical properties of the cured resins and evaluation on the completed transparent touch panels is shown in Table 2.

Second and Third Embodiments

These embodiments represent TTP's manufactured using the same procedure as in the first embodiment, but changing the composition of the UV curing resin for the insulating section as shown in Table 1.

Fourth Embodiment

This embodiment represents a TTP manufactured using the same procedure as in the first embodiment, but using an electron beam, in place of the ultra violet source for curing the resin in the Insulating section.

Fifth Embodiment

FIG. 1 is an exploded perspective view of a hand held computer, or an electronic system in accordance with a fifth exemplary embodiment of the present invention. Referring to FIG. 1, the hand held computer of the present embodiment comprises a TTP 1 attached at the bottom surface of an upper case 2, an LCD device 3 disposed underneath the TTP 1, and a control circuit 4 disposed underneath the LCD device 3. The control circuit contains a central processing unit, a memory device and other electronic components, an upper case 2 holding a battery 5 for supplying power to the hand held computer, and a lower case 6. The TTP 1 and the LCD device 3 are coupled with the control circuit 4 by flexible circuit boards 7 and 8, respectively.

Pressing on the TTP 1 with a finger, or a pen, drives the control circuit 4 for turning the power ON/OFF, selecting software and putting the selected software into operation. The control circuit 4 contains a central processing unit and memory devices related to operation of the hand held computer. The LCD device 3 provides a display corresponding to function input therein.

The present embodiment provides a hand held computer, incorporating a TTP manufactured with materials that are hygienic and environment-friendly, also suitable to large scale production.

COMPARATIVE EXAMPLES 1–3

TTPs are fabricated by the same procedure. as in the first embodiment in these examples, except the composition of the UV curing resin for the insulating section is varied as shown in Table 1.

Below is described an experiment conducted on the TTPs provided in accordance with the above embodiments along with comparative examples.

The glass transition temperature (Tg) of a cured resin used for the insulating section is obtained by reading the inflection point in the TMA curve obtained under the following test conditions:

Sample Dimensions: 1–100 μm thick, a square having a side not shorter than 5 mm

Measuring Apparatus: Thermo-Mechanical analyzer TMA-50 made by Shimadzu Co.

Measuring Conditions: Probe diameter: 5 mm

Load: 10 g

Speed of temperature rise: 10° C./min.

The weight % of methyl ethyl keton soluble component was calculated using the following formula:

MEK soluble component weight %={(w−wd)/w}=100
where; w represents initial weight of the curing resin,
wd represents weight of curing resin measured after being immersed in methyl ethyl keton (MET) for 24hrs and then removed and dried for 3 hrs at 40° C.

The adhesive strength was tested in accordance with JIS K-5400, a lattice pattern cutting test (Cross cut test). The adhesion was evaluated by calculating ratio of the remaining area to the whole area (100) after the cross cut test; no peeling at all was marked as 10.

The surface tackiness of cured material was confirmed by touching with a finger.

TTPs were evaluated by a drop test and an insulation test.

The drop test was conducted by letting a TTP to fall vertically on a concrete floor from 1 m high so that a side of the TTP compacts the floor surface.

The insulation test was conducted by storing TTPs with 10 VDC applied in an environment of 60° C., 90%RH for 500 hrs, and then testing the insulation integrity. Composition of the resins used in the above embodiments and comparative examples are shown in Table 1. Physical properties of the cured material and the test results for the TTPs are shown in Table 2.

TABLE 1

|  | Embodiment | | | | Comparative Example | | |
|---|---|---|---|---|---|---|---|
|  | 1 | 2 | 3 | 4 | 1 | 2 | 3 |
| Phenoxy ethyl acrylate | — | 20 | — | — | — | 40 | — |
| Di-cyclopentenyl ethyl acrylate | — | 20 | — | — | — | 17 | — |
| Tri-propylene glycol di-acrylate | 16 | — | — | 16 | 9 | — | — |
| Ethoxylated trimethylol propane tri-acrylate | 25 | — | 17 | 26 | 40 | — | 7 |
| Hexane diol di-acrylate | 16 | — | — | 16 | 8 | — | — |
| 2-acryloyloxy ethyl phtalate | — | 22 | — | — | — | 35 | — |
| Poly 2-hydroxyethyl acrylate | 30 | — | 70 | 30 | 30 | — | 80 |
| Poly 2-ethylhexyl acrylate | 5 | — | 5 | 5 | 5 | — | 5 |
| 1-hydroy-cyclohexyl phenyl keton | 1 | 1 | 1 | — | 1 | 1 | 1 |
| Talc | 5 | 5 | 5 | 5 | 5 | 5 | 5 |
| Silica | 2 | 2 | 2 | 2 | 2 | 2 | 2 |

TABLE 2

|  | Tg (° C.) | MEK soluble component (%) | Cross cut test | Surface Tackiness | Drop test | Insulation test |
|---|---|---|---|---|---|---|
| Embodiment |  |  |  |  |  |  |
| 1 | 75 | 35 | 10 | 0 | ◯ | ◯ |
| 2 | 30 | 5 | 8 | 0 | ◯ | ◯ |
| 3 | −10 | 75 | 10 | 0 | ◯ | ◯ |
| 4 | 80 | 35 | 10 | 0 | ◯ | ◯ |
| Comparative Example |  |  |  |  |  |  |
| 1 | 90 | 35 | 10 | 0 | X | ◯ |
| 2 | 45 | 2 | 2 | 0 | ◯ | ◯ |
| 3 | −15 | 10 | 10 | X | ◯ | ◯ |

As Table 2 shows, an insulating section having superior adhesion to the transparent resistive-layer and free from surface tackiness can be formed on the transparent resistive-layer when Tg of cured material in the resin used for the insulating section is not higher than 80° C. and content of MEK soluble component is within a range not lower than 5% by weight and not higher than 80% by weight. Substrates having transparent resistive-layers and provided with an insulating section that is made in accordance with the present embodiment leads to a tough TTP which is not easily breakable in the drop test.

Besides the materials listed in Table 1 for the insulating section, it has been found that adding a non cross-linking high polymer material to the resin material increases the adhesion of the insulating section to the transparent resistive-layer. Using a non cross-linking high polymer as the MEK soluble component, a test of the adhesion of the insulating section to the transparent resistive-layer was conducted. These insulating sections showed quite a satisfactory result, receiving an evaluation mark of 10 in the crosscut test.

On the other hand, when Tg of the cured material is high, as in comparative example 1, the transparent touch panel has a tendency to break during the drop test. The reason seems to be that: a cured material whose Tg is higher than 80° C. readily invites breakage due to shock initiated at the cured resin, even when a material of high toughness is used for the transparent resistive-layer substrate.

Analysis was also conducted on adhesion to the transparent resistive-layer substrate with respect to the MEK soluble component that is left without being taken into the 3-dimensional cross-linking by the UV, or EB irradiation. The results revealed that adhesion to the transparent resistive-layer was insufficient when the % weight of MEK soluble component in the cured material is small, as in comparative example 2. When the content of MEK soluble component is not more than 5% by weight, the number of peeled lattices reached 35–65 in the cross cut test out of the total of 100; the evaluation mark for the adhesion turned out to be 2, or lower in this case.

When the weight % of MEK soluble component in the cured material is high, as in comparative example 3, the surface tackiness generates a problem with the quality in the finished transparent touch panel. In a case where the content of MEK soluble component is higher than 80 weight %, although there is no problem with respect to the adhesion, the surface tackiness is caused due to the relatively reduced component of cross-linking material despite the irradiation of UV, or EB. This is a negative factor in the manufacturing, as well as during the operation of a transparent touch panel.

In terms of the insulating capability, every material having a composition as listed in the table proved to be satisfactory for providing transparent touch panels in the present embodiments and in the comparative examples, irrespective of the Tg or the weight % of MEK soluble component.

Either a photo curing resin by radical polymerization or a photo curing resin by cation polymerization may be used for the UV curing resin of the present invention. A suitable resin may be selected depending on the operating conditions.

There are following two major categories in the photo curing resin by radical polymerization. One is the acrylic (vinyl polymerization type) resin containing (meta)acrylic oligomer and (meta)acrylic monomer as the main components, using any one item out of the group of benzoyl aikylether derivatives, benzophenone derivatives, acetophenone derivatives and thioxyanthone derivatives as the photo polymerization initiator. The other is the polythiol polyene type (additional polymerization type) resin containing polyene (arylic non-saturation resin) and polythiol (resin containing mercapto radical) as the main components, using benzophenone derivatives as the photo polymerization initiator.

The photo curing resin by cation polymerization includes epoxy ring-opening polymerized resin containing epoxy resin and epoxy diluter as the main components, using aromatic diazonium salts which generate Lewis acid by light irradiation, aromatic halonium salts and aromatic sulphonium salts as the photo polymerization initiator.

Either a radical polymerization curing resin or a cation polymerization curing resin may be used for the EB curing resin of the present invention.

A radical polymerization UV curing resin may be used for the EB curing radical polymerization resin; in this case, however, there is no need of adding any photo-polymerization initiator or sensitizing agent needed for UV curing, since the energy is higher with EB than with UV.

A cation polymerization UV curing resin may be used for the EB curing cation polymerization resin.

For the non cross-linking high polymer, materials such as poly-chloroprene, poly-nitril butadiene, polystyrene, polyvinyl acetate, polyvinyl butylal, poly-acrylic acid esters, poly-methacrylic acid esters, polyvinyl chroride, a cellulose derivatives, polyether, polyester and polyamide may be used.

A filler may be added to the resin for the purpose of adjusting the printing characteristics or the viscosity. A metal oxide such as alumina or silica, a metal carbonate such as calcium carbonate, a metal sulfate such as barium sulfate, a metal silicate such as talc, for example, may be used as the filler. Depending on further needs, a plasticizer, a leveling agent, or a thixotropic agent may be added to the resin.

As described above, an insulating section of the present invention is formed on at least one of the substrates having transparent resistive-layer on a transparent resistive-layer by using a UV curing resin or an EB curing resin. The insulating section is for the purpose of securing insulation on the transparent resistive-layers in a region other than the input section. Thus, the structures of the present invention create a TTP that is suitable to the large scale production and is friendly to the environment; both of these features are points that conventional TTPs could not satisfy well.

We claim:

1. A transparent touch panel comprising two substrates, each of the substrates having
   a whole surface including
   an input area and
   a region other than the input area,
   a transparent resistive-layer formed over the whole surface, and an insulating section formed on at least one of said transparent resistive-layers in the region other than the input area using an ultra violet curing resin or an electron beam curing resin wherein said insulating section contains a methyl ethyl keton soluble component of not less than 5 weight % and not more than 80 weight %.

2. The transparent touch panel of claim 1, wherein glass transition temperature of cured material of said ultra violet curing resin or said electron beam curing resin is not higher than 80° C.

3. The transparent touch panel of claim 2, wherein
   a non cross-linking high polymer material is used for said methyl ethyl keton soluble component.

4. An electronic apparatus comprising at least
   a display device,
   a transparent touch panel disposed on the display surface of said display device, and
   a control circuit for controlling said display device and said transparent touch panel; wherein
      said transparent touch panel comprises two substrates, each of the substrates having a whole surface including an input area and
a region other than the input area,
a transparent resistive-layer formed over the whole surface, and an insulating section formed on at least one of said transparent resistive-layers in the region other than the input area using an ultra violet curing resin or an electron beam curing resin,
wherein a glass transition temperature of cured material of said ultra violet ray curing resin or said electron beam curing resin is not higher than 80° C. and said insulating section contains a methyl ethyl keton soluble component of not less than 5 weight % and not more than 80 weight %.

5. The electronic apparatus of claim 4, wherein
a non cross-linking high polymer material is used for said methyl ethyl keton soluble component.

6. A transparent touch panel comprising two substrates, each having a transparent resistive-layer, wherein
an insulating section is formed on at least one of said transparent resistive-layers using an ultra violet curing resin or an electron beam curing resin, and said insulating section contains a methyl ethyl keton soluble component of not less than 5 weight % and not more than 80 weight %.

* * * * *

UNITED STATES PATENT AND TRADEMARK OFFICE
CERTIFICATE OF CORRECTION

PATENT NO. : 6,628,268 B1
DATED : September 30, 2003
INVENTOR(S) : Mitsuru Harada et al.

It is certified that error appears in the above-identified patent and that said Letters Patent is hereby corrected as shown below:

<u>Column 6,</u>
Line 55, "2" should read -- 1 --

Signed and Sealed this

Sixth Day of April, 2004

JON W. DUDAS
*Acting Director of the United States Patent and Trademark Office*